Figure 1:
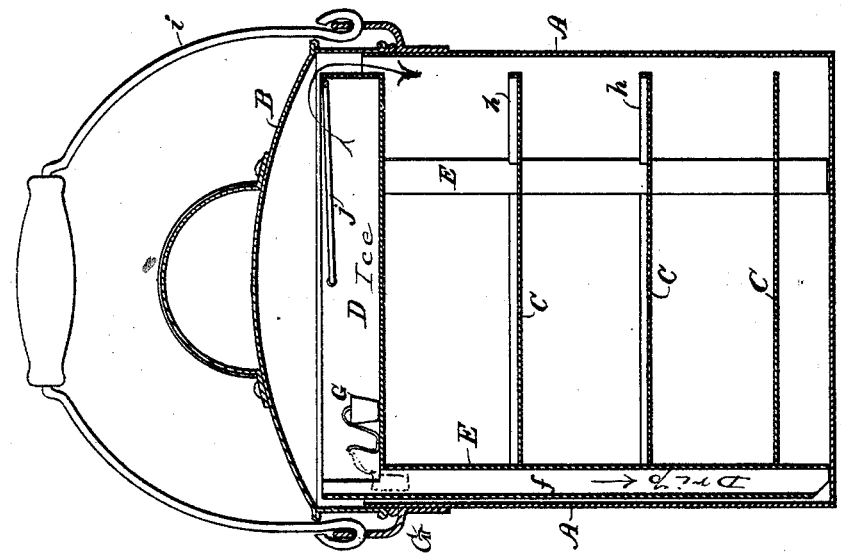

B. F. ROBERTS.
BUTTER-CARRIER.

No. 170,770.　　　　　　　　　　Patented Dec. 7, 1875.

WITNESSES:　　　　　　INVENTOR:
Austin F. Park　　　　Benjamin F. Roberts
James T. Goodfellow

UNITED STATES PATENT OFFICE.

BENJAMIN F. ROBERTS, OF BENNINGTON, VERMONT.

IMPROVEMENT IN BUTTER-CARRIERS.

Specification forming part of Letters Patent No. 170,770, dated December 7, 1875; application filed July 14, 1875.

*To all whom it may concern:*

Be it known that I, BENJAMIN F. ROBERTS, of the village of Bennington, in the county of Bennington and State of Vermont, have invented certain new and useful Improvements in Butter-Carriers, of which the following is a specification, reference being had to the accompanying drawing.

The principal object of this invention is to produce a simple, cheap, and durable butter-carrier, in which rolls, plates, or pats of butter can be easily kept cool and conveniently carried or transported from place to place, without being marred; and of which carrier a removable part shall constitute a self-cooling waiter, from which the rolls, plates, or pats of butter can be readily distributed in nice condition to guests at table.

One part of this invention consists of a portable waiter having shelves, one over another, and a chamber for ice over the shelves, and all secured together and supported by standards, so that the shelves will hold plates, rolls, or pats of butter, while cold air will descend from the ice-chamber and surround the shelves and cool the butter thereon, and at the same time the butter can be freely taken off laterally from the shelves in serving at table, the waiter being formed with legs which extend downward from the outer portion of its lower part, and thereby stably support the waiter in upright position when placed on a floor or level surface.

Another part of this invention consists of a butter-carrier composed essentially of a pail or vessel having therein a removable cooling-waiter of the aforesaid kind, having legs standing on the outer portion of the bottom of the pail or vessel, so as to effectually support the waiter in upright position therein, and so that the sides or casing of the pail or vessel shall keep plates, rolls, or pats of butter on the shelves of the waiter in transportation, and shall confine the cool air from the ice, closely around the shelves, and so the waiter can be lifted out of the pail or vessel, and then used in serving the butter at table, while the pail or vessel may be used for other purposes.

Another part of my invention consists in the combination, with a pail or similar vessel, of a butter-waiter, in and removable from the pail or vessel, and having shelves, one over another, a chamber for ice over the shelves, and standards which support and project laterally beyond the shelves and ice-chamber, so as to serve as guides in putting the waiter into the pail or vessel, and be close to the inner surface of the latter, and thereby prevent lateral movement or shaking of the waiter within the pail or vessel in transportation, and, at the same time, leave space through which cold air from the ice-chamber will descend and circulate between the sides of the pail or vessel and the outer portions of the ice-chamber and shelves.

My invention further consists in the combination, with a pail, tub, or similar vessel, of a waiter in and removable from the vessel, and having shelves, one over another, an ice-chamber over the shelves, supporting-legs standing on the outer part of the bottom of of the pail, tub, or vessel, and standards which support the shelves and ice-chamber, and of which one standard is tubular and will conduct water from the ice chamber to the bottom or lower part of the vessel, and can be closed by a cock, valve, plug or stopper, so that dripping of water from the ice-chamber will be prevented whenever the waiter shall be taken out of the vessel and used separately.

My invention consists, finally, of a butter-carrier composed of a pail or vessel having a removable cover thereon, and a waiter in and removable from the pail or vessel, and having shelves, one over another, an ice-chamber over the shelves, and standards which support and project laterally beyond the shelves and ice-chamber, and of which standards one is tubular and connects the lower part of the ice-chamber with the lower part of the pail or vessel, and can be closed and opened by a plug, valve, or cock, substantially as hereinafter set forth.

Figure 2:
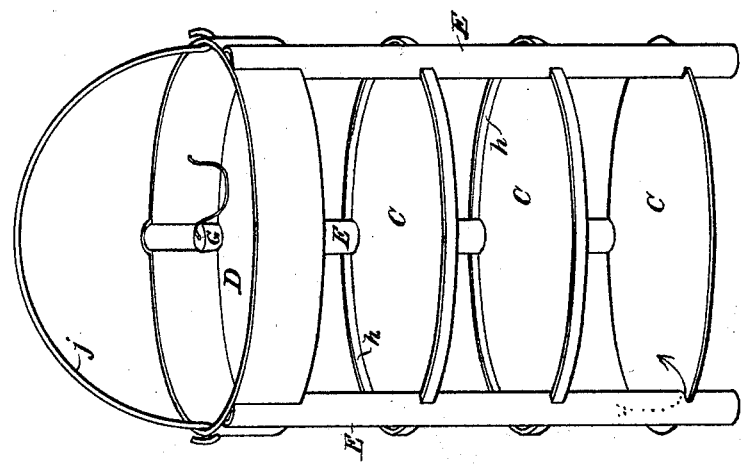

In the aforesaid drawing, Figure 1 is a central vertical section of a butter-carrier which embodies all the aforesaid parts of my invention; and Fig. 2 is a view of a part of the same removed, and constituting a self-cooling waiter for service at table.

A is a pail or vessel having a removable cover, B, and a removable butter-cooling waiter in the pail or vessel. This waiter is shown separate in Fig. 2, and has two or more shelves, C, one over another, and also has a chamber or pan, D, for holding ice directly over the shelves. Standards E are arranged and firmly fastened to the shelves C and ice-chamber D, so as to securely support the same, and leave lateral openings through which the butter can be readily placed upon and removed from the shelves. The standards E extend downward from, and below, the outer portion of the lower shelf, and constitute legs, which stand on the outer part of the bottom of the pail, or vessel, and thereby stably support the whole waiter in upright position, and leave a sufficient space under the lower shelf for the free circulation of cold air, and retention of water descending from the ice-chamber.

The standards E are preferably formed and arranged so as to project laterally beyond the shelves C and ice-pan D, and serve as guides in putting the waiter into the pail or vessel A, and so as to fit closely within the latter, and prevent lateral shaking of the waiter within the pail or vessel in transportation, and, in order to form spaces through which cold air from the ice-chamber D can descend and circulate between the outer edges of the shelves and the sides or walls of the vessel or pail inclosing the waiter. One of the standards E is preferably made tubular, as shown at $f$ in Fig. 1, and open at its bottom, and in communication at its top with the lower part or bottom of the interior of the ice-chamber D, so that when the waiter is in the pail or vessel A, as shown in Fig. 1, water from melting ice in the chamber D will run and be conducted down through the tubular standard into the lower part of the pail or vessel, below the shelves C, without spattering or dripping upon the shelves. To prevent the water from dripping or escaping from the ice-chamber D down through the tubular standard when the waiter shall be removed from the pail or vessel, a stopper, G, is to be inserted in the upper end of the tubular standard, as indicated in Fig. 2, or that standard may be furnished with a valve or stop-cock for the same purpose. The shelves C are preferably made with flanges $h$, to prevent rolls, pats, or plates of butter from sliding off from the shelves when the waiter alone shall be carried about by hand.

In carrying out this invention, the pail or vessel A, with its cover B and the removable waiter, are to be made of sheet metal, wood, or other suitable material; and I generally prefer to have the pail or vessel and waiter of circular form, but they may be made square or of any other practicable shape; and I commonly make the pail or vessel A with a bail, $i$, and the waiter with a bail, $j$, substantially as shown in the drawing, but lifting lugs or handles may be on the vessel and waiter in place of the bails.

The improved apparatus above described, and represented in Fig. 1, is a very cheap, convenient, and effective contrivance for use by dairymen, butter-dealers, and hotel, restaurant, and boarding-house keepers in transporting and preserving in good shape and condition rolls, plates, and pats of butter prepared for table use; and the waiter, when removed from the pail or vessel, as shown in Fig. 2, is a very convenient self-cooling server for use in distributing the butter at table.

I do not broadly claim shelves arranged one over another with an ice-chamber over the shelves, and all connected together, so that the same can be lifted as an entirety out of a case.

What I claim as my invention is—

1. A butter-waiter having shelves C, one over another, an ice-chamber, D, over the shelves, and standards E supporting the shelves and ice-chamber, and having legs which sustain the waiter at its lower periphery, substantially as shown and described.

2. The combination, with the pail or vessel A, of a butter-waiter in and removable from the pail or vessel, and having shelves C, one over another, an ice-chamber, D, over the shelves, and standards E, supporting the shelves and ice-chamber, and having legs standing on the outer portion of the bottom of the pail or vessel, substantially as set forth.

3. In combination with the pail or vessel A, the removable butter-waiter, having shelves C, an ice-chamber, D, over the shelves, and standards E, supporting and projecting laterally beyond the shelves and ice-chamber, substantially as shown, and as and for the purpose described.

4. In combination with the pail or vessel A, the removable butter-waiter, having shelves C, an ice-chamber, D, over the shelves, legs standing upon the outer portion of the bottom of the pail or vessel, and standards E, which support the ice-chamber and shelves, and of which standards one is tubular, and serves to conduct water from the ice-chamber to the bottom of the pail or vessel, substantially as shown and specified.

5. A butter-carrier, consisting of the pail or vessel A, having a removable cover, B, and a waiter in and removable from the pail or vessel, and having shelves C, ice-chamber D, over the shelves, and standards E, which support and project laterally beyond the shelves and ice-chamber, and of which standards one is tubular, and serves to conduct water from the ice-chamber to the lower part of the pail or vessel, substantially as described.

In testimony whereof I hereunto set my hand this 10th day of July, 1875.

BENJAMIN F. ROBERTS.

Witnesses:
JAMES B. MEACHAM,
A. P. LYMAN.